3,732,339
FILAMENTS AND FILMS OF ACRYLONITRILE POLYMERS WHICH ARE FREE FROM VACUOLES
Carlhans Suling and Heino Logemann, Leverkusen, Germany, assignors to Farbenfabriken Bayer Aktiengesellschaft, Leverkusen, Germany
No Drawing. Filed Mar. 25, 1971, Ser. No. 128,180
Claims priority, application Germany, Mar. 26, 1970, P 20 14 764.2
Int. Cl. C08f 29/56
U.S. Cl. 260—898   13 Claims

ABSTRACT OF THE DISCLOSURE

Vacuole free filaments and films of acrylonitrile homopolymers and copolymers containing at least 80% acrylonitrile, which contain 0.1 to 4% of a copolymer of acrylonitrile and dimethylacrylamide.

---

This invention relates to vacuole-free filaments and films of acrylonitrile homopolymers and copolymers.

One of the disadvantages of filaments or film produced from acrylonitrile homopolymers or copolymers, for example with acrylic acid esters or vinyl acetate, is that they contain vacuoles. The effect of the vacuoles is that the filaments and films acquire a more or less matt or dull appearance when treated with water or steam at elevated temperature. Filaments are inevitably exposed during some stage of processing to the action of hot water or of steam; for example, filaments may be so exposed during stretching and crimping, yarns produced from them may, for example, be exposed during dyeing processes, and made-up fabrics will be exposed during washing and ironing. The dulling effect attributable to the vacuoles cannot be prevented and is evidently governed to a large extent by the external conditions, i.e. the intensity and the temperaure of the treatment with water, with the result that the end products obtained from the filaments or films have a far from uniform appearance.

It has now been found that the formation of vacuoles in filaments or films of acrylonitrile homopolymers and copolymers can be significantly reduced, or even avoided altogether, providing copolymers of acrylonitrile with dimethyl acrylamide are added to the spinning solutions of the acrylonitrile homopolymers and copolymers and organic solvents, in quantities of from 0.1 to 4%, based on the acrylonitrile polymer.

Therefore, it is an object of this invention to provide filaments and films of acrylonitrile polymers that are free of vacuoles, or the content of vacuoles of which is at least significantly reduced.

This object is accomplished by a filament and a film of acrylontrile polymers, consisting of a mixture of (a) from 99.5 to 96% by weight of an acrylonitrile polymer selected from the group consisting of an acrylonitrile homopolymer and an acrylonitrile copolymer containing at least 80% by weight of copolymerised acrylonitrile, and (b) from 0.5 to 4% by weight of a copolymer of from 80 to 20 mol percent of acrylonitrile and from 20 to 80 mol percent of dimethyl acrylamide.

The filaments and films according to the invention are obtained by a process which comprises mixing in a solvent (a) from 99.5 to 96% by weight of an acrylonitrile polymer selected from the group consisting of an acrylonitrile homopolymer, an acrylonitrile copolymer containing at least 80% by weight of copolymerised acrylonitrile, and (b) from 0.5 to 4% by weight of a copolymer of from 80 to 20 mol percent of acrylonitrile and from 20 to 80 mol percent of dimethyl acrylamide and processing the solution thus obtained into filaments and films.

The molecular weight of the copolymer (b) added in accordance with the invention can be varied within wide limits. Broadly speaking, copolymers with K-values [according to H. Fikentscher, Cellulose-chemie 13 (1932), page 58] of from 2 to 100 are effective, copolymers with a K-value of from 25 to 40 being particularly favourable. The percentage composition of the copolymers of acrylonitrile and dimethyl acrylamide added in accordance with the invention can also be varied within wide limits. Thus, vary boardly, copolymers of dimethyl acrylamide and acrylonitrile containing from 20 to 80 mol percent of dimethyl acrylamide, show the require effect. Optimum activity is governed to a lesser extent by the composition of the basic material used for the fibres or the film [component (a)].

It is surprising that, even when added in such small quantities, the copolymer of dimethyl acrylamide and acrylonitrile should provide such a favourable effect, because a similarly prepared copolymer, comprising, for example, monomethyl acrylamide and acrylonitrile, is ineffectual. In the case of filaments and films of copolymers of acrylonitrile with up to 20% of a second polymerisable vinyl, vinylidene, acrylic or methacrylic compound, for example, methyl acrylate, methyl methacrylate, vinyl acetate, styrene, vinyl chloride or vinylidene chloride, the effect obtained by the small addition is as intense as that obtained in filaments based on acrylonitrile homopolymers.

The usual polar solvents for polyacrylonitrile, such as dimethyl formamide, dimethyl acetamide, ethylene carbonate, γ-butyrolactone, dimethyl sulphoxide, or hexamethyl phosphoric acid triamide etc., are suitable organic solvents for use in the preparation of spinning solutions from the mixture according to the invention.

Although it is known from DAS 1,059,614 that the addition of from 30 to 5 parts by weight of a homopolymer of an acrylamide derivative corresponding to the general formula

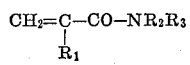

in which $R_1$ represents hydrogen or methyl, and $R_2$ and $R_3$ represent hydrogen or alkyl with 1 to 6 carbon atoms, or the addition of copolymers comprising at least 50% of these acrylamides or methacrylamide derivatives to 70 to 95 parts by weight of a copolymer of vinylidene chloride or vinyl chloride and acrylonitrile, improves both the hydrophilicity and the dyeability of filaments and fibres obtained from the polymer mixtures, it was nevertheless surprising, and by no means foreseeable as a technical effect, that the addition according to the invention of a very much smaller quantity of the particular acrylonitrile/dimethyl acrylamide copolymers would be able to stabilise filaments of acrylonitrile homopolymers and copolymers against the formation of vacuoles. The reason for the effect of these polymers on the development of vacuoles is not known, nor is it exhibited by the described polymers obtained from monomers of general Formula I; it is in fact specific to dimethyl acrylamide/acrylonitrile copolymers. Whereas the hydrophilicity and dyeability of acrylonitrile fibres are improved, for example, by copolymerising acrylonitrile with acrylamide or methylacrylamide derivatives corresponding to the general formula

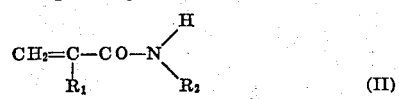

in which $R_1$ represents hydrogen or methyl, and $R_2$ represents a lower alkyl radical; these copolymers do not prevent the development of vacuoles as do the copolymers of acrylonitrile and dimethyl acrylamide added in accordance with the invention. Neither do the graft polymers and graft copolymers of acrylonitrile and derivatives of acrylamide or methacrylamide described in U.S. patent specifications Nos. 2,620,324; 2,649,434; 2,657,191; 2,776,270 and 2,838,470, corresponding to the general formula

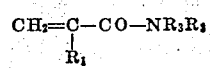

in which $R_1$ represents hydrogen or methyl, and $R_2$ and $R_3$ represent hydrogen or alkyl with 1 to 6 carbon atoms; as such or as additives to fibre-forming acrylonitrile polymers even in quantities as large as 10%, produce the technical effect obtained in accordance with the invention by adding the copolymers of acrylonitrile and dimethyl acrylamide.

The composition of filaments of polymers mixtures used according to the invention differs fundamentally from that of filaments or polymers according to the aforementioned U.S. patent specifications in that the filaments according to the invention consist of polymer mixtures which do not contain any graft polymer. Moreover, the technical effect obtainable in accordance with the aforementioned U.S. patent specification is not obtained by mixing in the copolymers used in accordance with the invention, either as regards the effect on dyeability or as regards the improvement in hydrophilicity. Instead, it has surprisingly been found that, according to the invention, the addition of less than 4% by weight of copolymers of dimethyl acrylamide with acrylonitrile is sufficient to prevent the development of vacuoles in filaments and films.

The dyeability of the fibres and films can be improved, in known manner, if component (a) of the starting material, which is employed in a quantity of at least 96% by weight, comprises a small quantity, usually about 1% by weight, of a comonomer with acidic or basic groups, for example styrene sulphonic acid, a disulphonimide, vinyl pyridine, dimethylaminoethyl methacrylate, or a sulphobetaine.

The copolymers are tested for their activity as stabilisers against vacuole formation as follows:

Films of the acrylonitrile polymer or of the mixture of acrylonitrile polymer (a) with copolymer (b) are treated in accordance with the following scheme:

(1) Boiling for 1 hour in water at 100° C.,
(2) Drying for 1 hour at 50° C.,
(3) Tempering for 20 minutes at 140° C., and
(4) Boiling for 1 hour in water at 100° C.

The following results are obtained from tests conducted on a film of a copolymer (a) without the addition of (b):

| Treatment stage: | Appearance of the film |
|---|---|
| 1 | Hazy |
| 2 | Hazy |
| 3 | Clear |
| 4 | Hazy |

When addition is effective as a substance which prevents vacuole formation, significantly clearer films are obtained as early as in stages 1 and 2, but more particularly on completion of stage 4 of the treatment scheme. Filaments behave in the same way as films.

In the following examples, which are to further illustrate the invention, all percentages are by weight unless otherwise indicated. The parts by weight relate to parts by volume as kg. to liter.

EXAMPLE 1

Preparation of the acrylonitrile/dimethyl acrylamide copolymer 330 parts by weight of dimethyl acrylamide and 177 parts by weight of acrylonitrile (molar ratio 1:1) are polymerised under nitrogen for 8 hours at 80° C. in 3300 parts by volume of tert-butanol by means of 13.2 parts by weight of azodiisobutyrodinitrile. The first polymer flakes appear after 25 minutes. After cooling, the product settles at the bottom of the polymerisation vessel in the form of a solid, pale yellowish deposit. The supernatant liquid is run off, the precipitated polymer is washed with a mixture of petroleum ether and tert-butanol in a ratio of 1:1 and then dried in vacuo at 50° C. It is obtained in a yield of 90% and has a K-value of 29.7, as measured in dimethyl formamide at 20° C. Another 5% of polymer having a K-value of 20 can be precipitated from the tert-butanol by petroleum ether.

EXAMPLE 2

10% solutions in dimethyl formamide are prepared from a copolymer of acrylonitrile comprising 4.5% of methyl acrylate and 1% of methacryloyl aminobenzene-benzene disulphonimide having a K-value of 85, alone and with additions of 1, 2, 3 and 4% by weight of the copolymer of dimethyl acrylamide and acrylonitrile described in Example 1. Films drawn from these solutions and dried at 50° C. are boiled in water for 1 hour, dried, tempered for 20 minutes at 140° C. and then boiled again for 1 hour in water. The dulling of the films is assessed as follows:

| | Films boiled for 1 hour | | | Boiled for 1 hour |
|---|---|---|---|---|
| | Moist | Dried | Tempered at 140° C. | |
| No additive | Distinctly hazy, white specs | Distinctly hazy, white specs | Clear, isolated white specs | Hazy. |
| 1% of additive | Very slightly hazy | Slightly hazy on one side | Slightly hazy along one edge | Clear. |
| With 2% of additive | Almost clear | Almost clear | Clear | Do. |
| With 3% of additive | Minimal hazing | Very little hazing | do | Do. |
| With 4% of additive | Clear | Clear | do | Do. |

Dulling under the influence of boiling water is significant reduced by the addition of only 1% by weight of the copolymer indicated, and is eliminated altogether by additions in excess of 2% by weight.

COMPARISON EXAMPLE 1

Preparation of an acrylonitrile/monomethyl acrylamide copolymer 11.2 parts by weight of monomethyl acrylamide and 7 parts by weight of acrylonitrile (molar ratio 1:1) are polymerised under nitrogen for 8 hours at 80° C. in 100 parts by volume of tert-butanol by means of 0.4 part by weight of azodiisobutyrodinitrile. The polymer begins to precipitate after 10 minutes. On completion of precipitation, the fine-grained product is filtered under suction, washed with twice the quantity of a mixture of equal parts by volume of tert-butanol and petroleum ether and then with petroleum ether on its own, and dried in vacuo at 50° C. The mother liquor does not contain any polymeric material that can be precipitated with petroleum ether. A yield of 83% is obtained; the K-value, measured in dimethyl formamide at 25° C., being 71.

COMPARISON EXAMPLE 2

10% solutions in dimethyl formamide are prepared from a copolymer of acrylonitrile with 4.3% of methylacrylate and 1% of methacryloylaminobenzene-benzene disulphonimide, alone and with the addition of 1, 2, 3 and 4% by weight of the copolymer of monomethyl acrylamide and acrylonitrile described in Comparison Example 1. Films drawn from these solutions and dried at 50° C. are boiled in water for 1 hour, dried, heated for 20 minutes at 140° C., and then boiled in water again for 1 hour. The dulling of the films is assessed as follows:

| | Film boiled for 1 hour | | Tempered at 140° C. | Boiled for 1 hour |
| --- | --- | --- | --- | --- |
| | Moist | Dried | | |
| Without any additive | Recognizably hazy | Recognizably hazy, isolated specs. | Clear, isloated white specs | Slightly dull. |
| With 1% of additive | Uniformly hazy | Uniformly whitish haze | Uniformly whitish haze | Whitish haze. |
| With 2% of additive | do | do | do | Do. |
| With 3% of additive | do | do | do | Do. |
| With 4% of additive | do | do | do | Do. |

The copolymer of monomethyl acrylamide and acrylonitrile does not prevent the films from dulling in boiling water, but instead makes them even more hazy in appearance than they are without the addition after tempering at 140° C.

What we claim is:

1. A vacuole-free filament or film of polymerized acrylonitrile consisting essentially of a mixture of
   (a) 99.5 to 96% by weight of an acrylonitrile homopolymer or copolymer with methyl acrylate, methyl methacrylate, vinyl acetate, or styrene containing 80 to 100% by weight of polymerized acrylonitrile; and
   (b) 0.5 to 4% by weight of a copolymer of 80 to 20 mol percent acrylonitrile and 20 to 80 mol percent dimethyl acrylamide.

2. The filament or film of claim 1 wherein said component (a) is a copolymer of acrylonitrile and methyl acrylate or methyl methacrylate.

3. The filament and film of claim 1, wherein said copolymer (b) has a P-value of from 10 to 100.

4. The filament and film of claim 1, wherein said copolymer (b) has a K-value of from 25 to 40.

5. The filament and film of claim 1, wherein said component (a) comprises a comonomer with acidic or basic groups.

6. The filament and film of claim 5, wherein said comonomer with acidic or basic groups is selected from the group consisting of styrene sulphonic acid, a disulphonimide, vinyl pyridine, dimethylaminoethyl methacrylate and a sulphobetaine.

7. A process for the production of vacuole-free filaments or films which comprises mixing in a solvent
   (a) 99.5 to 96% by weight of an acrylonitrile homopolymer or copolymer with methyl acrylate, methyl methacrylate, vinyl acetate or styrene containing 80 to 100% by weight of polymerized acrylonitrile; and
   (b) 0.5 to 4% by weight of a copolymer of 80 to 20 mol percent acrylonitrile and 20 to 80 mol percent dimethyl acrylamide,
and processing the solution thus obtained into filaments or films.

8. The process of claim 7 wherein said component (a) is a copolymer of acrylonitrile and methyl acrylate or methyl methacrylate.

9. The process of claim 7, wherein said mixing is carried out in a solvent selected from the group consisting of dimethyl formamide, dimethyl acetamide, ethylene carbonate, γ-butyrolactone, dimethyl sulphoxide and hexamethyl phosphoric acid triamide.

10. The process of claim 7, wherein said copolymer (b) has a K-value of from 10 to 100.

11. The process of claim 7, wherein said copolymer (b) has a K-value of from 25 to 40.

12. The process of claim 7, wherein said component (a) comprises a comonomer with acidic or basic groups.

13. The process of claim 12, wherein said comonomer with acidic or basic groups is selected from the group consisting of styrene sulphonic acid, a disulphonimide, vinyl pyridine, dimethylaminoethyl methacrylate and a sulphobetaine.

References Cited

UNITED STATES PATENTS

| 2,831,826 | 4/1958 | Coover et al. | 260—32.8 |
| 3,039,524 | 6/1962 | Belck et al. | 28—82 |
| 3,139,621 | 6/1964 | Stewart | 260—41 |

OTHER REFERENCES

Schildknecht: Vinyl and Related Polymers, pub. 1952, pp. 282–286.

SAMUEL H. BLECH, Primary Examiner

C. J. SECCURO, Assistant Examiner

U.S. Cl. X.R.

264—211; 260—30.4 N, 30.6 R, 30.8 DS, 32.6 N, 895

UNITED STATES PATENT OFFICE
CERTIFICATE OF CORRECTION

Patent No. 3,732,339  Dated May 8, 1973

Inventor(s) Carlhans Suling et al

It is certified that error appears in the above-identified patent and that said Letters Patent are hereby corrected as shown below:

Column 1, line 22, "film" should read --films--.

Column 2, line 19, "require" should read ---required---.

Column 4, line 4, "Flaments" should read ---filaments---.

Column 5, line 41, Claim 3 - "P-value" should read ---K-value---.

Signed and sealed this 19th day of November 1974.

(SEAL)
Attest:

McCOY M. GIBSON JR.
Attesting Officer

C. MARSHALL DANN
Commissioner of Patents